United States Patent [19]

Yamanaka

[11] 4,054,314
[45] Oct. 18, 1977

[54] MOTOR TRUCK

[75] Inventor: Akira Yamanaka, Yokohama, Japan

[73] Assignee: Mitsubishi Jidosha Kogyo Kabushiki Kaisha, Tokyo, Japan

[21] Appl. No.: 709,313

[22] Filed: July 28, 1976

Related U.S. Application Data

[62] Division of Ser. No. 503,398, Sept. 5, 1974, abandoned.

[51] Int. Cl.² ............................................. B62D 27/06
[52] U.S. Cl. .................................. 296/35 R; 188/1 C; 180/82 R
[58] Field of Search .............. 296/35 A, 35 R, 28 M; 280/106 R; 180/1, 82 R, 91; 188/1 C

[56] References Cited

U.S. PATENT DOCUMENTS

| | | | |
|---|---|---|---|
| 2,962,295 | 11/1960 | Tenenbaum | 280/81 |
| 3,162,479 | 1/1964 | Hewitt | 296/35 |
| 3,381,995 | 5/1968 | Carter | 296/35 |
| 3,717,224 | 2/1973 | Leach | 188/1 C |
| 3,831,998 | 8/1974 | Hewitt | 296/35 R |
| 3,981,530 | 9/1976 | Yamanaka et al. | 296/35 R |

*Primary Examiner*—Philip Goodman
*Attorney, Agent, or Firm*—Oldham & Oldham Co.

[57] ABSTRACT

A motor truck comprising energy transforming means located between a chassis frame and a rear body and adapted to allow an upward movement of the body relative to the frame to absorb kinetic energy of the body upon collision.

6 Claims, 17 Drawing Figures

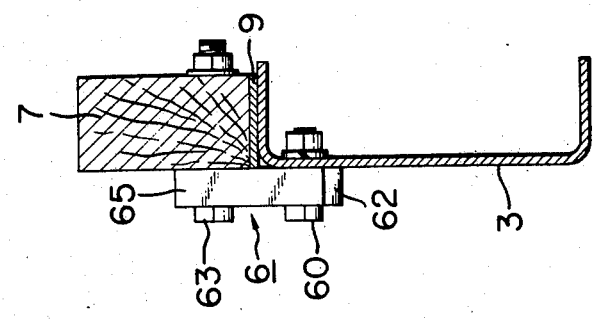
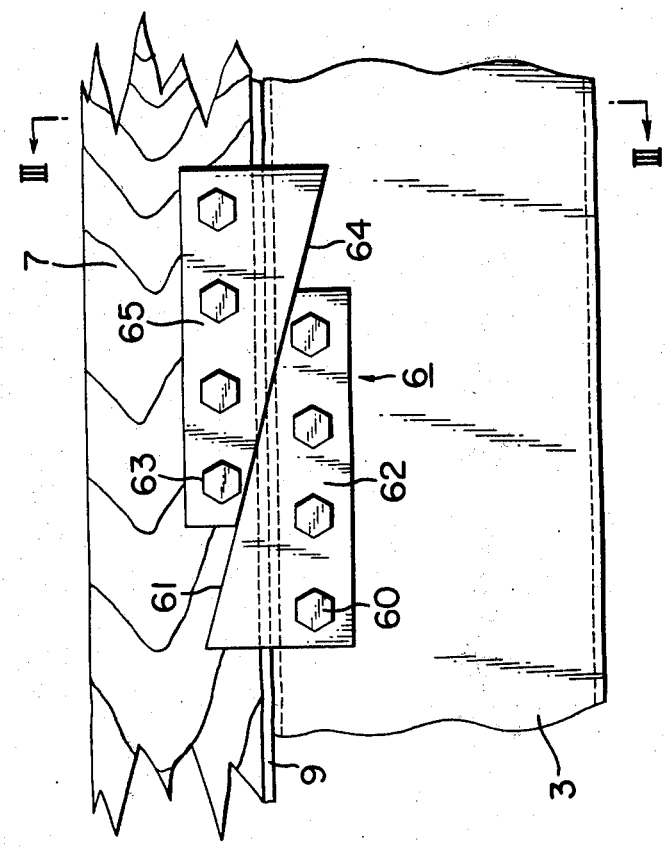

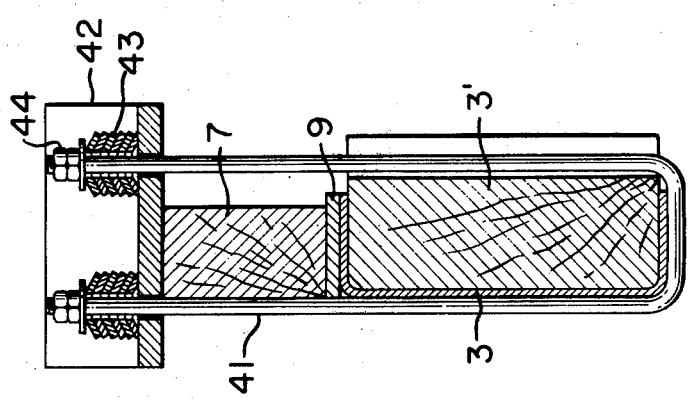
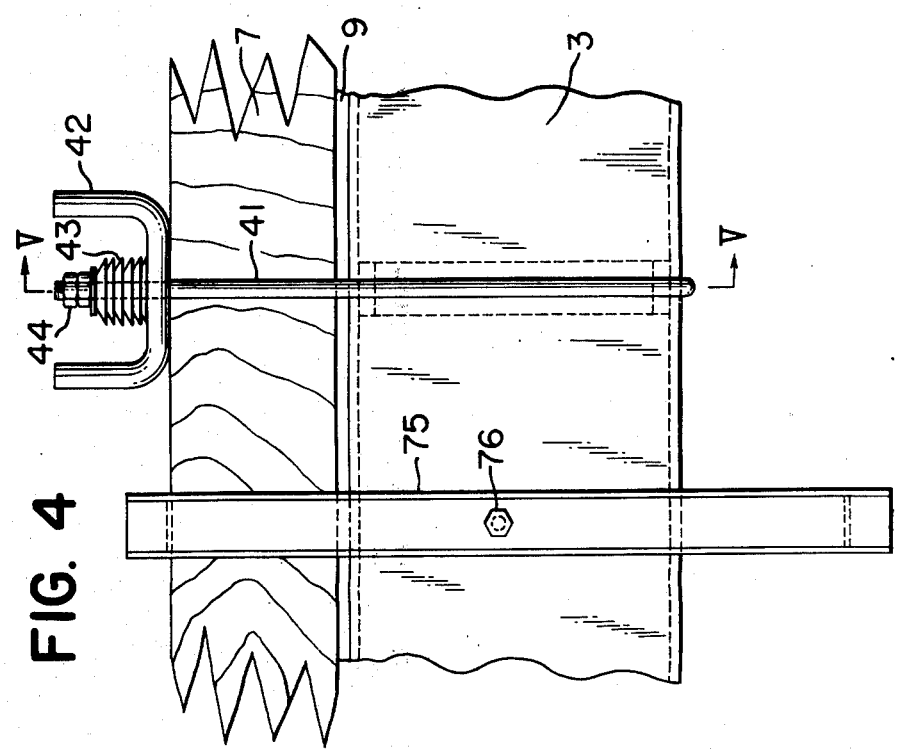

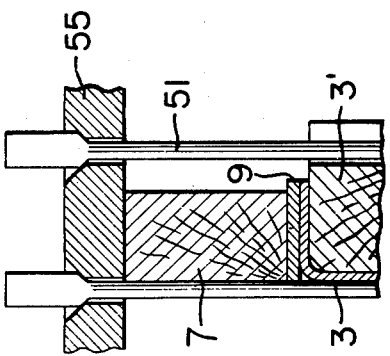
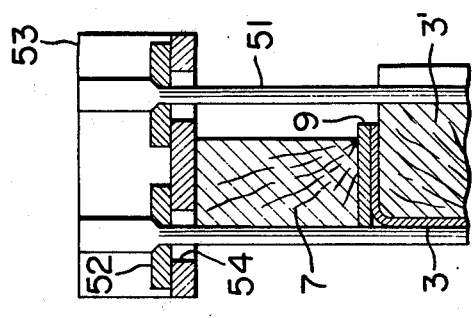
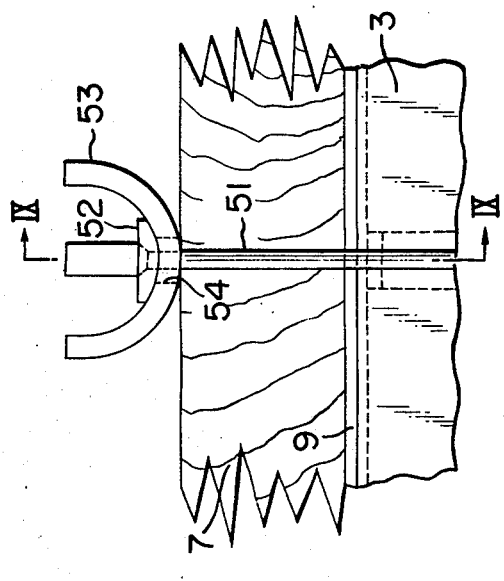

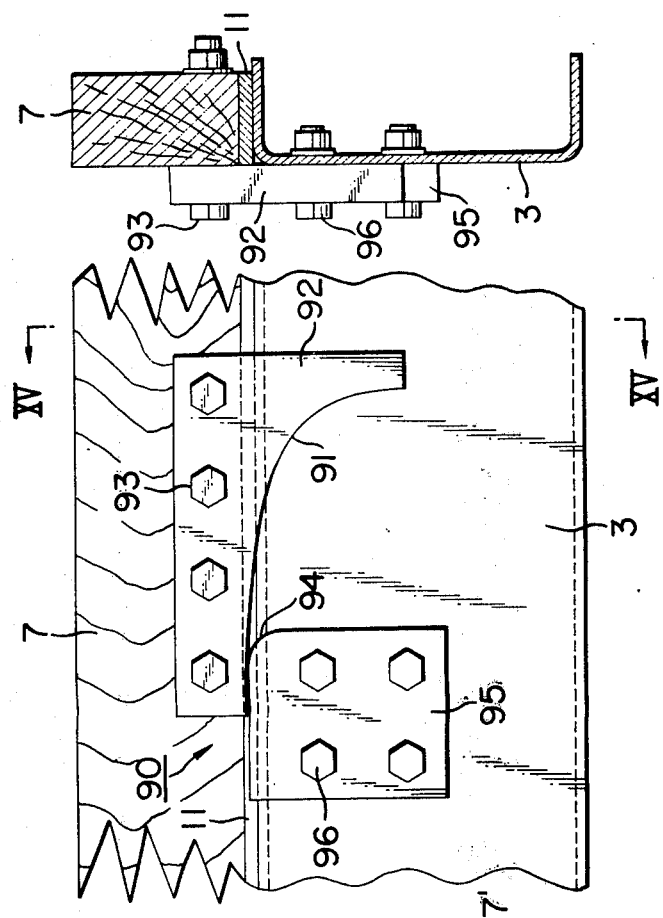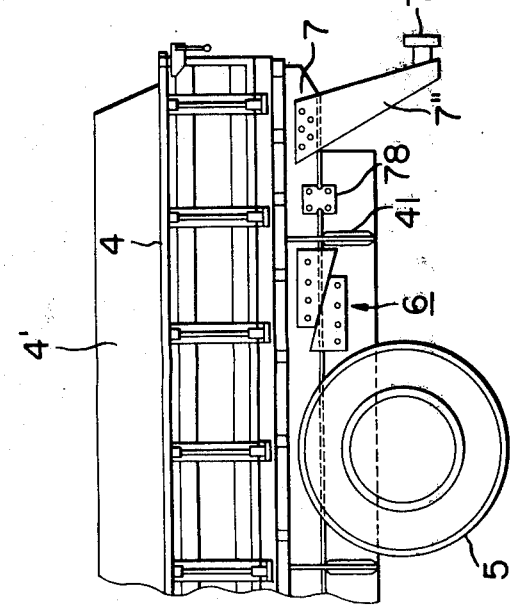

MOTOR TRUCK

This is a divisional application four prior application Ser. No. 503,398 filed Sept. 5, 1974, now abandoned.

BACKGROUND OF THE INVENTION

This invention relates to a motor truck in which impact force affecting the crew in the truck upon collision is absorbed.

Due to heavy gross vehicle weight of motor trucks, conventional energy absorbing systems for protecting the crew in the trucks upon collision must have larger size than that used for motor cars to absorb sufficiently the impacting energy. In the conventional energy abosrbing systems, acceleration of gravity applied to the crew upon the collision becomes great because of great additional force resulting from a rear body and a load thereon, though a chassis frame is capable of absorbing the energy by its inherent plastic deformation.

SUMMARY OF THE INVENTION

To avoid the above drawbacks, this invention provides a motor truck comprising energy transforming means located between a chassis frame and a rear body and adapted to allow an upward movement of said body relative to said frame by a longitudinal impacting force, thereby absorbing kinetic energy of the body.

When a vehicle collides against the motor truck according to the invention and the impacting force acting onto the rear body of the truck exceeds a predetermined value, the body is moved upwardly by means of the energy transforming means and the chassis frame is urged downwardly by a reaction of the upward movement of the body, since the combined weights of the body and the load thereon occupy more than a half of the gross vehicle weight of the truck. Therefore, longitudinal kinetic energy acting onto the rear body upon the collision of the vehicle is transformed into potential energy through the upward movement of the body in opposition to the gravity. The kinetic energy is also absorbed through depression of the chassis frame and sequent deformation of suspensions by the reaction of said upward movement. Furthermore, the kinetic energy is absorbed through plastic deformation of U-bolts tightening the frame and the body upon the upward movement thereof. Therefore, in the conventional motor truck whole kinetic energy generated upon collision acts on the chassis frame in the longitudinal direction thereof, but in the truck according to the invention the kenetic energy is abosrbed as described above so that the impacting force affecting the crew in a cab through the chassis frame is reduced. Also, when the body is moved upwardly upon the collision of vehicle and the chassis frame is depressed by the reaction of upward movement of the body, the wheel are urged on the ground through the suspensions so that the motor truck according to the invention is sufficiently braked without locking and effectively prevented from its forward movement upon braking operation of the crew, also the kinetic energy received from the vehicle is absorbed upon said braking operation.

BRIEF DESCRIPTION OF THE DRAWINGS

FIG. 2 shows a side view of a part of FIG. 1, FIG. 3 shows a cross-sectional view taking along the line III—III in FIG. 2, FIG. 4 shows a side view of assembling part of the U-bolt in FIG. 1, FIG. 5 shows a cross-sectional view taking along the line V—V in FIG. 4, FIG. 8 shows a second modified view of FIG. 4, FIG. 9 shows a cross-sectional view taking along the line IX—IX in FIG. 8, FIG. 10 shows a third modified view of FIG. 4, FIG. 11 shows a cross-sectional view taking along the line XI—XI in FIG. 10, FIG. 12 shows a partial side view of the truck in FIG. 1, with a bumper at the rear end of its body, FIG. 14 shows a side view of a part of FIG. 13, FIG. 15 shows a cross-sectional view taking along the line XV—XV in FIG. 14.

DETAILED DESCRIPTION

Figure 1:
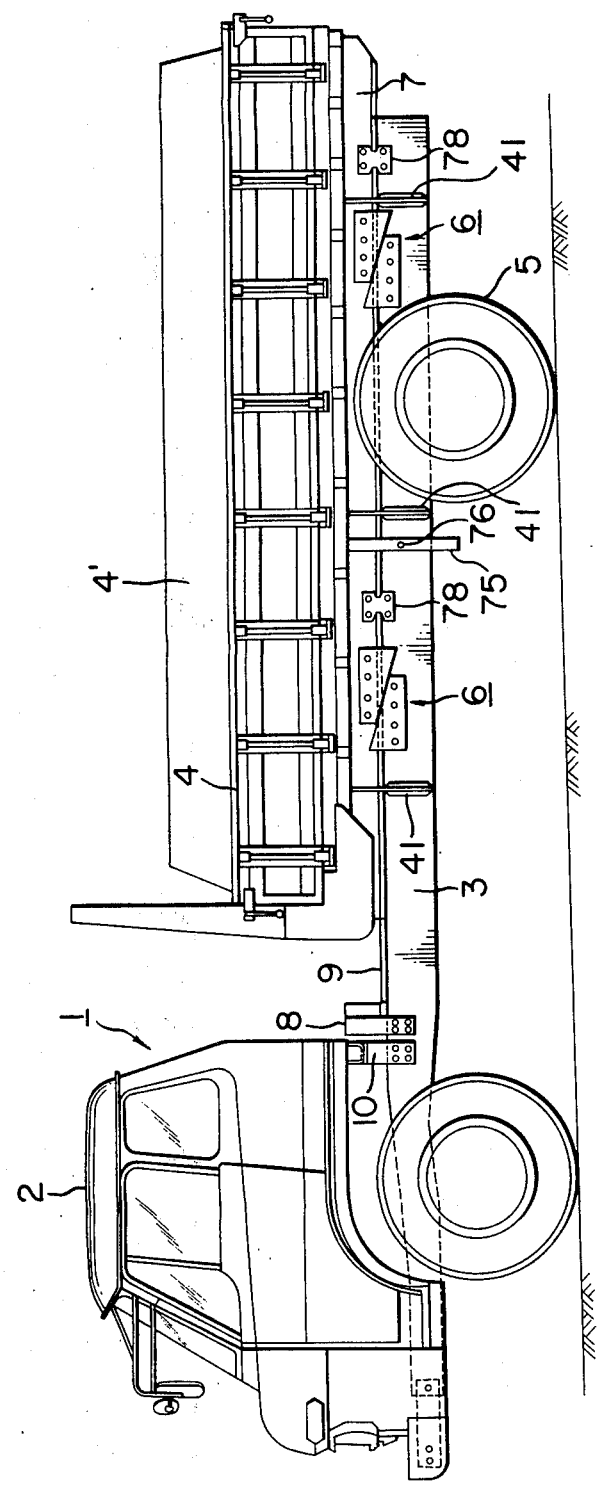
FIG. 1 shows a side view of one embodiment of a motor truck according to the invention.

In the first embodiment shown in FIGS. 1 to 3, a cab-over type motor truck 1 has a cab 2, a chassis frame 3, a rear body 4, wheels 5 and energy transforming means 6. The cab 2 is secured to the frame 3. The frame 3 and the body 4 are fixed by means of U-bolts 41 through a bolster 7 securely fixed to the body. The U-bolts 41 are stretchable through its plastic deformation when tensile force applied to the U-bolts exceeds a predetermined value.

As seen from FIGS. 4 and 5, the U-bolt 41 holds the frame 3, a reinforcing member 3', a cushion 9 and the bolster 7 and the upper end of the U-bolt passing through a washer plate 42 is tightened by a nut 44 through belleville springs 43. The belleville springs 43 are provided for relieving an initial impacting force.

Figure 7:
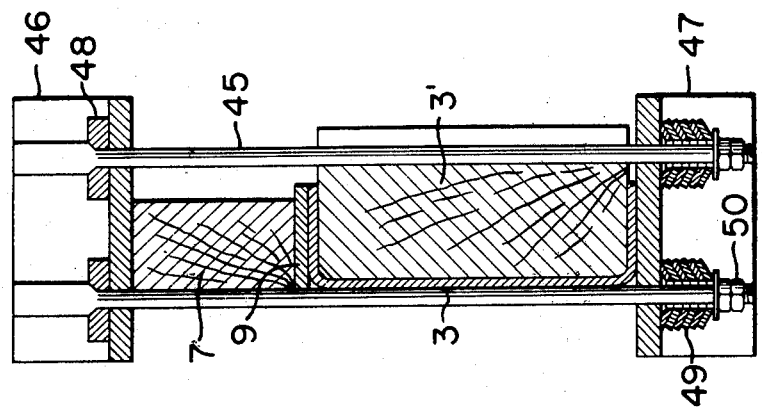
FIG. 7 shows a cross-sectional view taking along the line VII—VII in FIG. 6.
Figure 6:
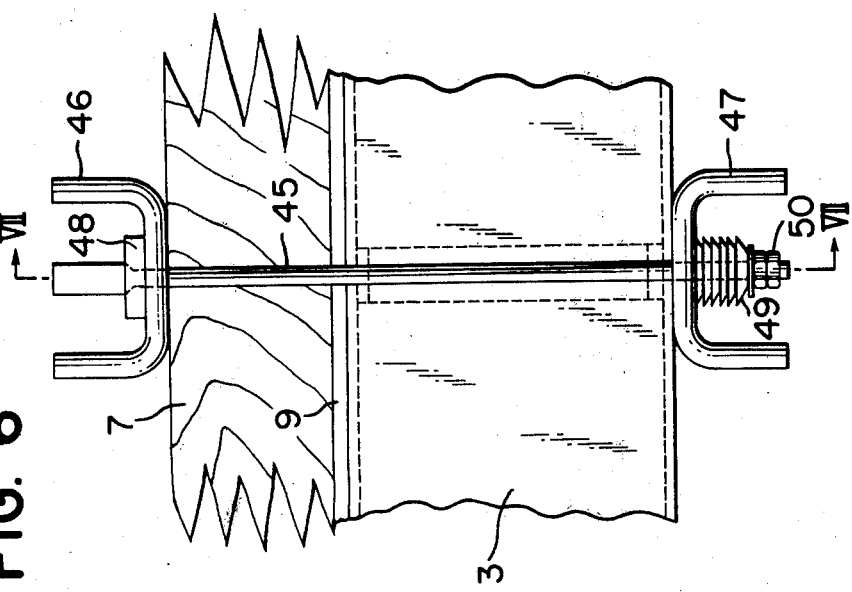
FIG. 6 shows a first modified view of FIG. 4.

In the first modification of the U-bolt 41, as shown in FIGS. 6 and 7, two bolts 45 hold the chassis frame 3 and upper and lower ends of the bolt 45 pass through washer plates 46 and 47 respectively. A die 48 is fitted on a stepped diameter portion of the upper end of the bolt 45 while the lower end thereof is tightened through belleville springs 49 by the means of a nut 50, so that the larger diameter portion of the upper end is extracted through the die 48 upon the upward movement of the rear body 4.

In the second modification of the U-bolt, as shown in FIGS. 8 and 9, a die 52 and a washer plate 53 are fitted on upper end of the bolt 51. The washer plate 53 has no flat portion, such as the washer plates 42 and 46, which contacts with the bolster 7, but has a periphery arcuated in its cross section and contacted with the bolster 7. The washer plate 53 has a bore 54 through which the bolt 51 passes. The diameter of the bore 54 is greater than that of the bolt 51 to provide a sufficient clearance between the bolt and bore. Therefore, even when the bolt 51 is inclined relative to the bolster 7 upon the relative movement between the bolt 51 and the rear body 4 in the longitudinal and vertical directions, an external periphery of the washer plate 53 is easily inclined integrally with the upper end of the bolt 51 due to arcuation of the plate without effecting bending force to the upper end of the bolt, thereby causing a smooth extraction of the bolt through the die 52.

In the third modification of the U-bolt, as shown in FIGS. 10 and 11, there is provided a washer plate 55 which is integrated with the washer plate 53 and the die 52 in the second modification to achieve the same effect as said modification.

An upward movement limiting means 75 for the rear body 4, as shown in FIG. 4, is fixed to the chassis frame 3 by means of a shear bolt 76 to limit the rear body 4 to move upwardly more than a desired height for example the height of the bolster 7 when the shear bolt 76 is sheared upon collision. The upward movement limiting means 75 consists of a frame formed by rigid channel members which holds the chassis frame 3 and the body 4 by its upper edge and side edges and has a space same as the height of the bolster 7 between its lower edge and the lower edge of the chassis frame 3.

Furthermore, shear plates 78 or shear bolts, not shown, which are sheared by an impacting force greater than a predetermined value are fixed between the rear body 4 and the chassis frame 3, thereby limiting normally the longitudinal movement of the body 4 relative to the frame 3. The wheels 5 are mounted on the frame 3 through leaf springs and, if desired, shock absorbers, not shown.

In FIGS. 2 and 3, the energy transforming means 6 consists of a plate 62 fixed to the frame 3 by means of bolts 60 and having a linear sliding surface 61 inclined forwardly and upwardly and a plate 65 fixed to the bolster 7 by means of bolts 63 and having a sliding surface 64 contacting with the surface 61.

A load 4' is carried on the rear body 4. A stopper 8 is fixed on the frame 3 in front of the body 4 to prevent sliding movement of the body 4 when the latter slides forwardly on the frame 3 by an abnormal impacting force. Instead of the stopper 8 an absorbing member for catching the moved rear body may be fixed on a rear edge of a cab mounting 10 or an engine may be mounted such that an upper portion of its rear end is positioned near to the rear of the cab 2 and above the chassis frame 3, thereby preventing the forward movement of the body 4. A cushion 9 may be located between the frame 3 and the body 4 for absorbing pressures on respective surfaces thereof. Also, a bumper 7' may be fixed to the rear end of the bolster 7 of the rear body 4 through stays 7" to catch an impacting force by the collision at the rear of the body 4, as shown in FIG. 12.

When the vehicle collides against the rear body 4 of the motor truck 1 and the body 4 receives an impacting force greater than the predetermined value, the shear plates 78 are sheared and the body 4 is moved forwardly. Therefore, the body 4 is moved upwardly relative to the chassis frame 3 along the forwardly and upwardly inclined sliding surfaces 61 and 64 of the energy transforming means 6. Upon the upward movement of the body 4 each U-bolt 41 is stretched vertically to cause its plastic deformation, thereby absorbing the kinetic energy for the upward movement of the body, and said movement is securely prevented from exceeding a predetermined height by the upward movement limiting means 75. As the combined weights of the body 4 and the load thereon occupy more than a half of the gross vehicle weight, the force urging the body 4 upwardly is great and the frame 3 is depressed by its reaction. The kinetic energy depressing the frame 3 is absorbed through the leaf springs and the shock absorbers. Also, the wheels 5 are urged on the ground by the reaction of said depressing force. Furthermore, upon upward movement of the body 4 the sliding surfaces 61 and 64 of the plates 62 and 65 slide relatively to each other so that the kinetic energy of the body 4 is absorbed by the frictional resistance therebetween.

Therefore, the kinetic energy acting onto the rear body 4 by the collision of the vehicle is absorbed by the U-bolts 41, the leaf springs and the shock absorbers. The impacting force affecting the crew in the cab 2 through the chassis frame 3 is absorbed through the plastic deformation of the U-bolts 41 and the transformation into the potential energy mainly by the upward displacement of the body 4 relative to the frame 3. Thus, in the motor truck according to the invention, the kinetic energy of the body 4 will not wholly effect forwardly as the conventional motor trucks and the acceleration of gravity applied to the crew is relieved. As the body 4 and the load thereon which occupy more than a half of the gross vehicle weight are moved upwardly upon the collision, the reaction force against said movement is great and the wheels are urged onto the ground by said reaction force. As the friction force between the wheels and the ground becomes great by said force urging the wheels onto the ground when the truck 1 is braked such as stopping, the forward movement of the truck 1 is effectively prevented, thereby reducing the possibility that the truck 1 collides against a vehicle in front of it. The impacting force applied to the crew in the cab 2 is also relieved since the forward movement of the truck 1 is prevented by said friction force.

The operation of the above embodiment will be described when the truck is collided from behind, but the same effect is obtained when the truck comes into a head-on collision.

Figure 13:
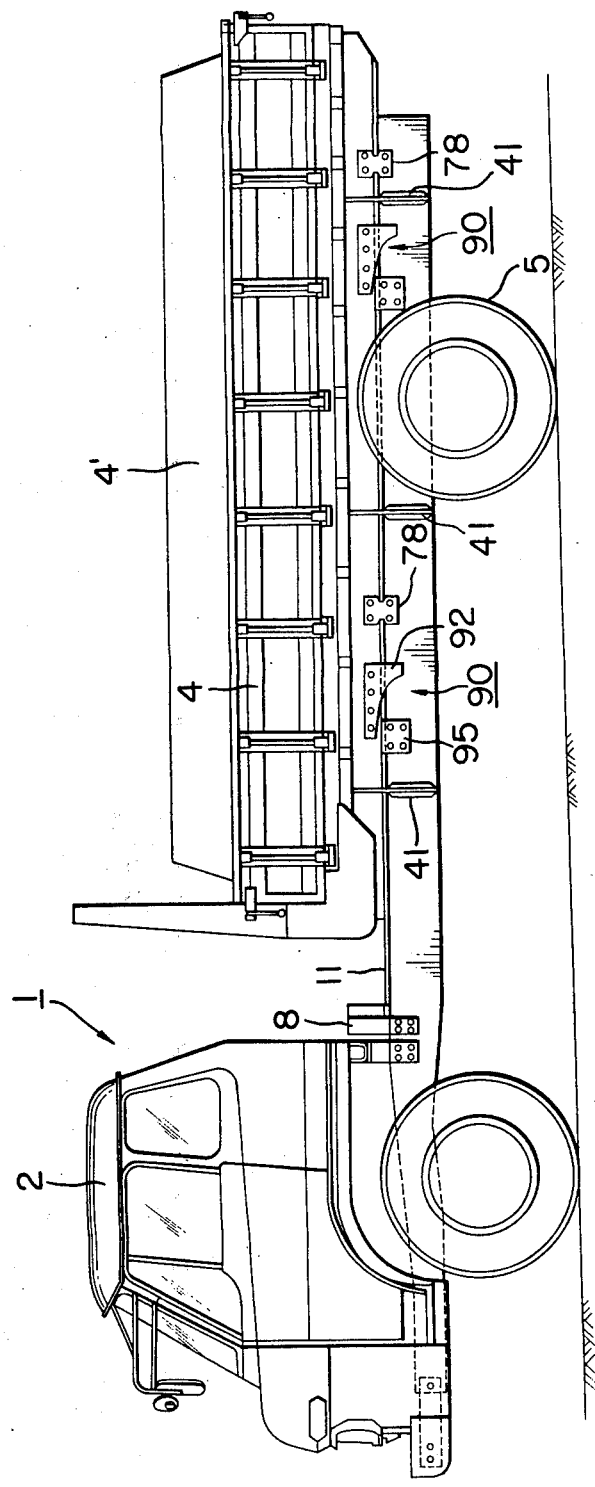
FIG. 13 shows a side view of another embodiment of a motor truck according to the invention.
Figure 17:
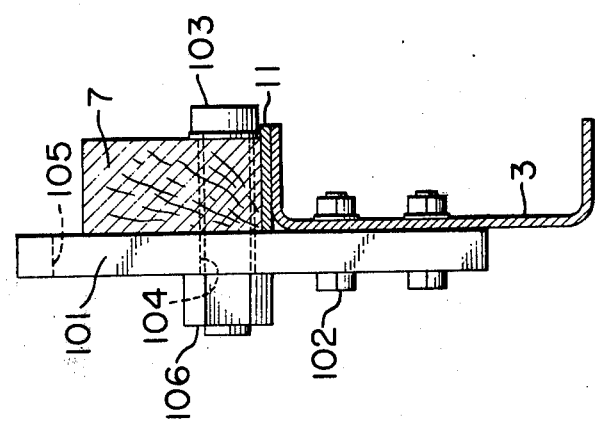
FIG. 17 shows a cross-sectional view taking along the line XVII—XVII in FIG. 16.
Figure 16:
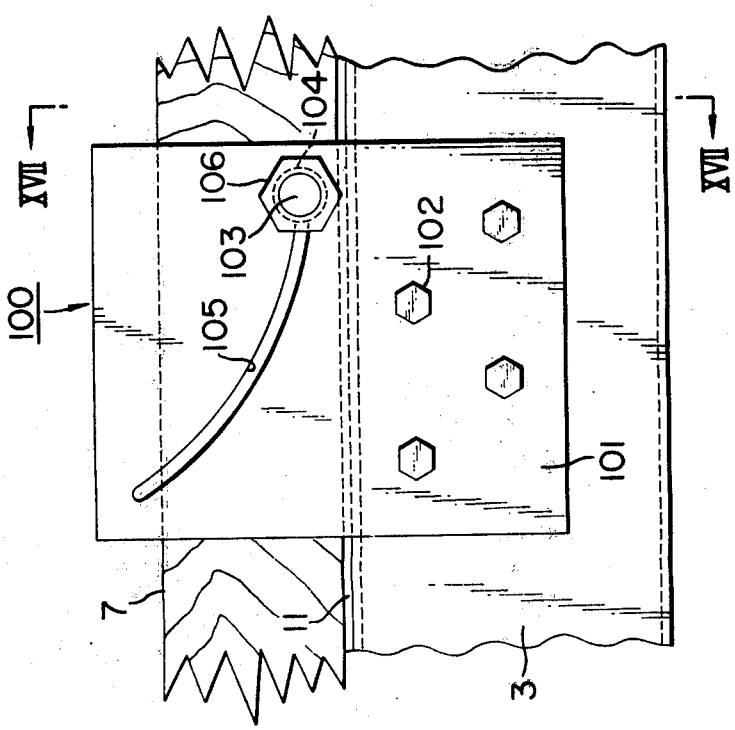
FIG. 16 shows a side view of a part of further embodiment of a motor truck according to the invention.

In the second embodiment as shown in FIGS. 13, 14 and 15, instead of the plate 62 and 65 of the energy transforming means 6 in the first embodiment with the linear inclined sliding surfaces, an energy transforming means 90 comprises a plate 92 having a sliding surface 91 of forwardly upward paraboloid and fixed at its upper portion to the bolster 7 by means of bolts 93 and a plate 95 fixed to the chassis frame 3 by means of bolts 96 and having a sliding surface 94 which is formed from a convex surface having a relatively small curvature and contacts with the sliding surface 91. A friction plate 11 is located between the frame 3 and the body 4 instead of the cushion 9 in the first embodiment. When a strong impacting force is applied to the rear body 4 by the collision, initially a substantially horizontal portion of the sliding surface 91 of the plate 92 slides on the plate 95 so that the body 4 slides only forwardly relative to the frame 3 without causing its upward movement. The friction plate 11 exhibits sufficiently its function to absorb some of the kinetic energy of the body 4. Upon forward displacement of the body 4 relative to the frame 3 at the rising portion of the sliding surface 91, the body 4 moves upwardly to absorb sufficiently said kinetic energy as described in the first embodiment. In this case, the frame 3 and the body 4 are tightened as in the first embodiment by the U-bolts 41 which are plastically deformed upon receiving the vertical tensile force greater than a predetermined value. In the third embodiment as shown in FIGS. 16 and 17, instead of using respective plates of energy transforming means 6 and 90, an energy transforming means 100 comprises a plate 101 which is fixed at its lower portion to the chassis frame 3 by means of bolts 102. The upper portion of the plate 101 is provided at right hand side in FIG. 16 with a bore 104 through which a bolt 103 passing through the bolster 7 is inserted and with a slot 105 which is curved forwardly and upwardly from the bore 104 and has a width much narrower than the diameter thereof. The bolt 103 passing through the bolster 7 and the plate 101 is tightened by a nut 106. When the strong impacting force in the direction of movement of the truck 1 is applied to the rear body 4, the bolt 103 spreads out the slot 105 to move the body 4 upwardly therealong, thereby absorbing the kinetic energy for the body 4 by the upward movement thereof and the spreading of the slot 105.

In this embodiment the plate 101 is fixed to the frame 3 and the belt 103 is mounted in the bolster 7 of the body 4, but it may be arranged that the plate 101 is fixed to the bolster 7 of the body 4 while the bolt 103 is fixed to the frame 3 to come into engagement of the bolt with the forward end of the slot.

In the above described embodiments, there is described the case when the rear body 4 is moved forwardly relative to the chassis frame 3 upon the collision, but the kinetic energy of the rear body 4 is absorbed in case of the rearward movement of the body 4 by, for example, the impacting force caused by the collision of another vehicle against the frame 3 by way of the reverse attachment of the energy transforming means.

While several complete embodiments of the invention have been disclosed herein, it will be appreciated that modification of these particular embodiments of the invention may be resorted to without departing from the scope of the invention.

What is claimed is:

1. A motor truck comprising a frame device, a body device movable relative to the frame device, bolt members extending vertically at opposite sides of said frame and body devices to hold said devices together, and an energy transforming means including a first plate member fixed to one of said devices and having an inclined first sliding surface and a second plate member fixed to the other of said devices and having a second sliding surface which slidably contacts with at least a portion of said first sliding surface and is inclined at an angle complementary to said first surface, said body device being moved upwardly by said energy transforming means when a longitudinal impacting force of or greater than a predetermined value is applied, and at least one shear plate fixed between said body and frame devices and adapted to be sheared by said longitudinal impacting force, but normally limiting the relative movement of said devices, said first and second sliding surfaces being linear.

2. A motor truck comprising a frame device, a body device movable relative to the frame device, bolt members extending vertically at opposite sides of said frame and body devices to hold said devices together, and an energy transforming means including a first plate member fixed to said frame device and having an inclined first sliding surface and a second plate member fixed to said body device and having a second sliding surface which slidably contacts with and is supported on at least a portion of said first sliding surface and is inclined at an angle complementary to said first surface, said first and second sliding surfaces being linear and being positioned to produce upward movement of said body device upon movement of said body device forwardly in relation to said frame device.

3. A motor truck as in claim 2 where said first and second plate members are so constructed and arranged that a greater length of said sliding surface of said second plate member progressively engages said sliding surface of said first plate member when said body device moves forwardly, and at least one shear plate fixed between said body and frame devices and adapted to be sheared by said longitudinal impacting force, but normally preventing relative movement of said devices.

4. A motor truck according to claim 3 wherein resilient means are operatively positioned between one of said devices and said bolt members to aid in absorbing kinetic energy from said body device on impact, said resilient means being at the upper ends of said bolt members and comprising bellville springs compressed by said bolt members against a metal plate which bears on said body device.

5. A motor truck according to claim 1, wherein resilient means are operatively positioned between one of said devices and said bolt members to aid in absorbing kinetic energy from said body device on impact.

6. A motor truck according to claim 1, wherein a washer plate is provided, and said bolt members extend through said washer plate and are stretchable by tensile forces above a predetermined value.

* * * * *